United States Patent [19]

Stenglein et al.

[11] Patent Number: 5,073,144

[45] Date of Patent: Dec. 17, 1991

[54] DRIVE ASSEMBLY FOR UNIVERSAL JOINT

[75] Inventors: Paul R. Stenglein; Robert C. Farrell, both of Frankenmuth; Michael A. Derry, Alma, all of Mich.

[73] Assignee: General Motors Corporation, Detroit, Mich.

[21] Appl. No.: 547,421

[22] Filed: Jul. 3, 1990

Related U.S. Application Data

[63] Continuation of Ser. No. 371,148, Jun. 26, 1989, abandoned.

[51] Int. Cl.$^5$ .................................... F16D 3/30
[52] U.S. Cl. ................................ 464/111; 384/44; 464/122; 464/168; 464/905
[58] Field of Search .............. 384/44, 45, 526, 570, 384/572, 573, 577, 578, 579; 464/111, 120, 122, 132, 168, 905

[56] References Cited

U.S. PATENT DOCUMENTS

| 1,169,469 | 1/1916 | Dunning | 384/579 |
| 2,528,987 | 11/1950 | Ablett | 384/570 |
| 3,586,405 | 6/1971 | Claesson | 384/526 |
| 4,239,304 | 12/1980 | Wakunami | 384/573 |
| 4,729,670 | 3/1988 | Murphy et al. | 464/111 X |
| 4,768,990 | 9/1988 | Farrell et al. | 464/111 |

Primary Examiner—Thomas R. Hannon
Attorney, Agent, or Firm—F. J. Fodale

[57] ABSTRACT

A drive assembly for a universal joint of the tripot type comprises a drive block and bearing rollers which are retained by two cage pieces which are mounted on the respective opposite driving sides of the drive block so that the bearing rollers on each driving side are retained by a single cage piece. The cage pieces are retained on the drive block by fastening the cage pieces to each other or to the drive block.

16 Claims, 3 Drawing Sheets

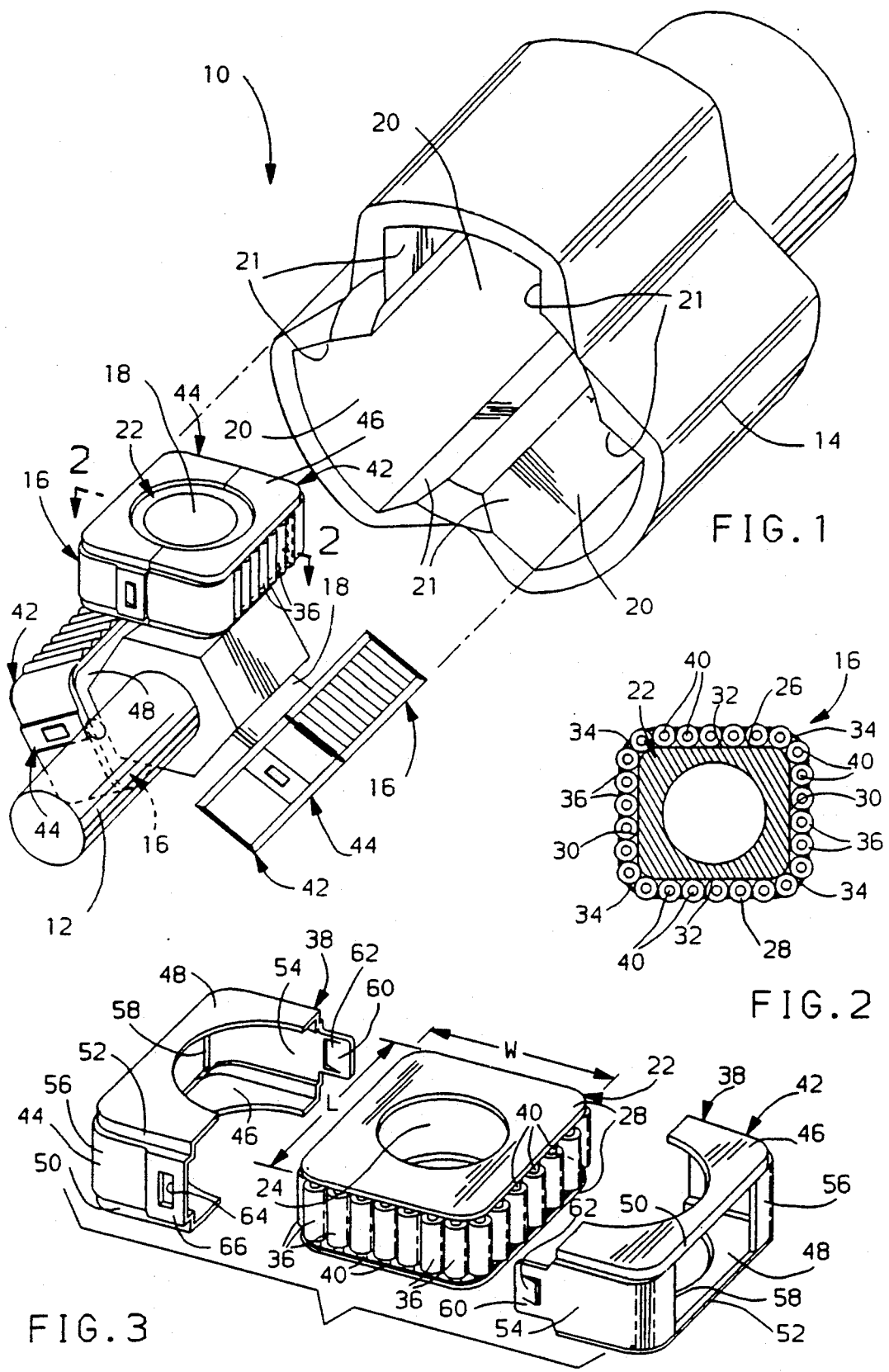

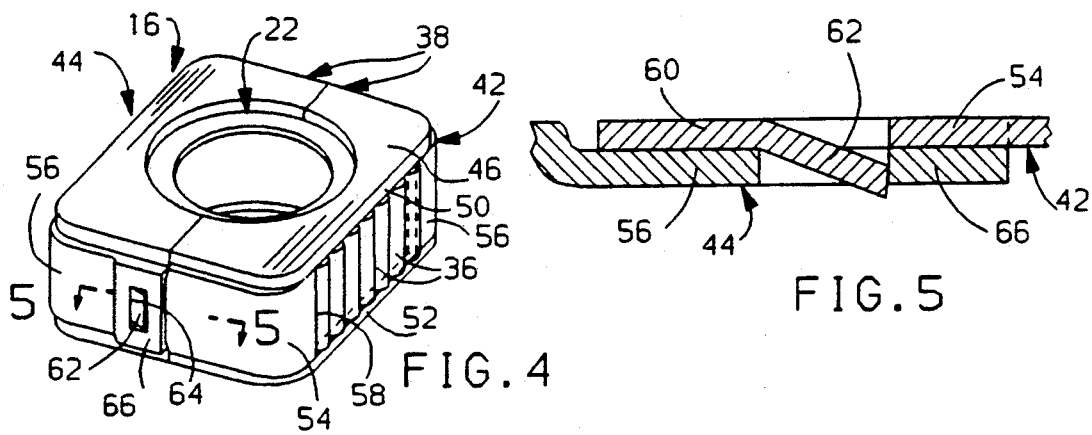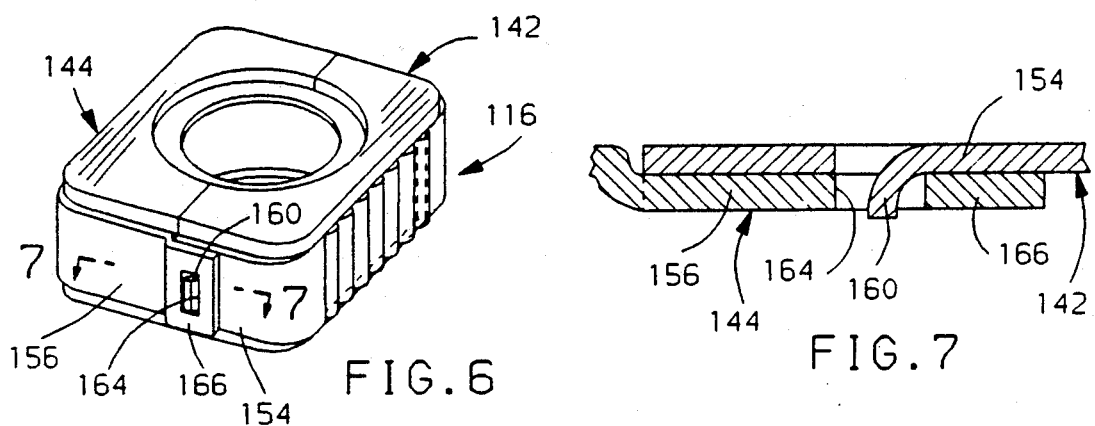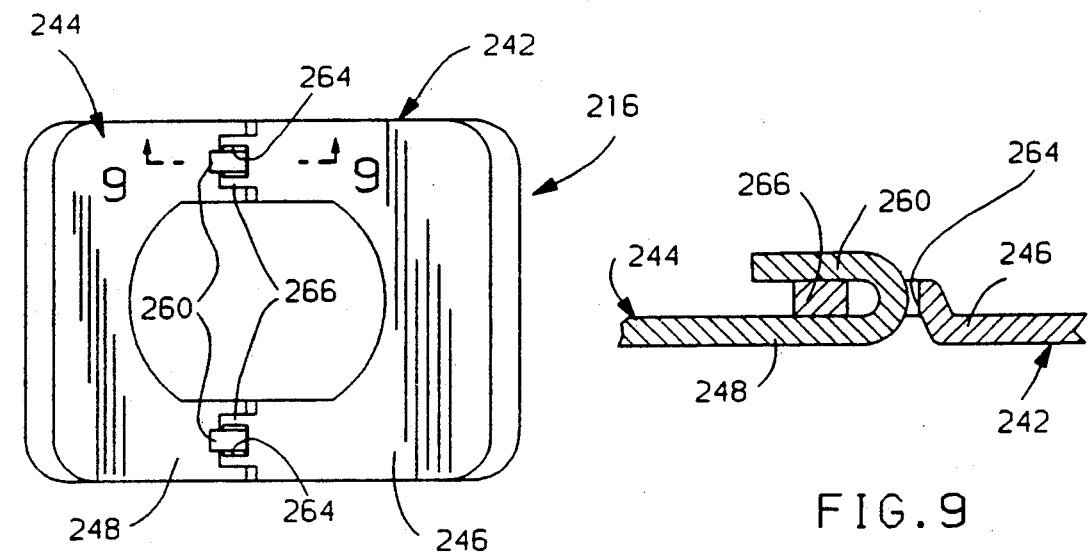

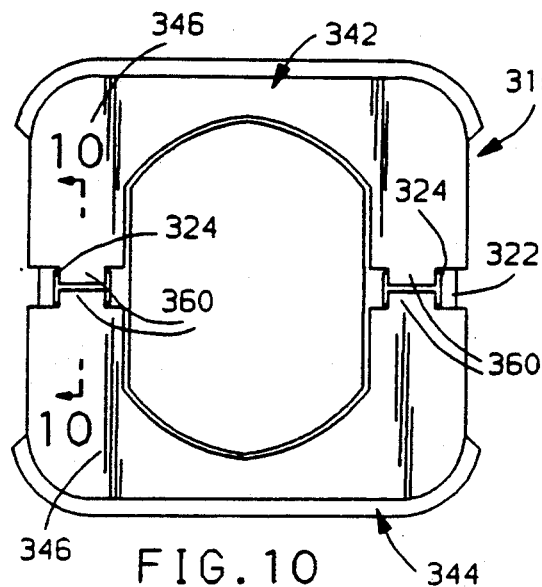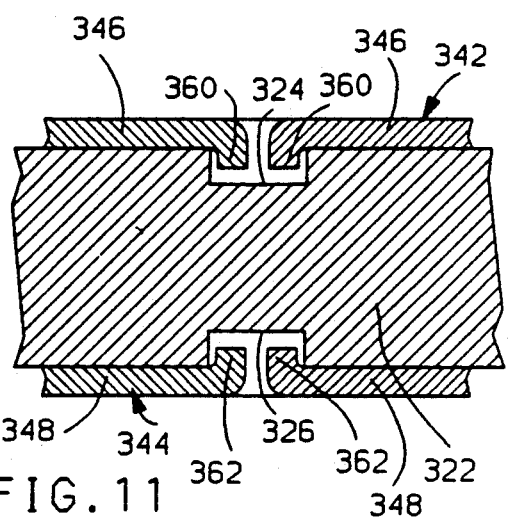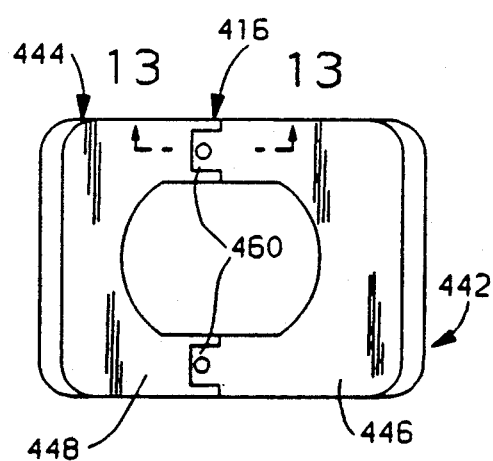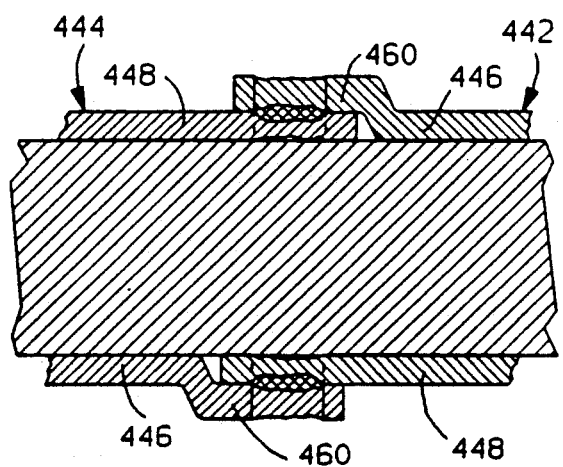

DRIVE ASSEMBLY FOR UNIVERSAL JOINT

This is a continuation of application Ser. No. 07/371,148 filed on June 26, 1989 now abandoned.

BACKGROUND OF THE INVENTION

This invention relates generally to drive assemblies and more specifically to drive assemblies for universal joints of the tripot type.

U.S. Pat. No. 4,768,990 issued to Robert C. Farrell and Raymond J. Schultz, Sept. 6, 1988 discloses several drive assemblies for a tripot universal joint. The assembly shown in FIGS. 1-5 comprises a drive block, bearing rollers and two cage pieces which are attached to the bearing block. The assembly shown in FIGS. 6-7 comprises a drive block and bearing rollers which are attached to the bearing block by pintles. The assembly shown in FIGS. 8-9 comprises a drive block, bearing rollers and two cage pieces which are attached to the bearing block.

U.S. Pat. No. 4,729,670 issued to Richard F. Murphy and Thomas J. Daul, Mar. 8, 1988 also discloses several drive assemblies for a universal joint of the tripot type. The assembly shown in FIGS. 1-5 comprises a roller block, trunnion rollers, two roller block covers to retain the trunnion rollers and a rectangular sleeve which fits over the two roller block covers. The assembly shown in FIG. 6 also comprises a roller block, trunnion rollers, two roller block covers and a rectangular sleeve which retains the roller block covers. The assembly shown in FIGS. 7-10 comprises a roller block, trunnion rollers, and two roller retaining members which are attached to the bearing block. The assembly shown in FIG. 11 comprises a block, trunnion rollers and a roller sleeve which retains the trunnion rollers.

SUMMARY OF THE INVENTION

The object of this invention is to provide an improved drive assembly for a universal joint.

A feature of the invention is that the improved drive assembly has two cage pieces which are mounted on the respective driving sides of the drive block so that the bearing rollers are retained on each driving side by a single cage piece.

Another feature of the invention is that the two cage pieces are retained on the drive block without the necessity of a retention sleeve.

Yet another feature is that the two cage pieces may be identical so that the manufacturing costs may be reduced.

Still yet another feature of the invention is that the two cage pieces may be retained on the drive block by fastening the two cage pieces to each other.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

BRIEF DESCRIPTION OF THE DRAWINGS

FIG. 1 is an exploded perspective view of a telescopic universal joint of the tripot type having drive assemblies in accordance with our invention.

FIG. 2 is a section taken substantially along line 2—2 of FIG. 1 looking in the direction of the arrows.

FIG. 3 is an exploded perspective view of one of the drive assemblies which is shown in FIG. 1.

FIG. 4 is a perspective view of the drive assembly which is shown in FIG. 3.

FIG. 5 is a section taken substantially along the line 5—5 of FIG. 4 looking in the direction of the arrows.

FIG. 6 is a perspective view of a second embodiment of a drive assembly in accordance with our invention.

FIG. 7 is a section taken substantially along the line 7—7 of FIG. 6 looking in the direction of the arrows.

FIG. 8 is a top view of a third embodiment of a drive assembly in accordance with our invention.

FIG. 9 is a section taken substantially along the line 9—9 of FIG. 8 looking in the direction of the arrows.

FIG. 10 is a top view of a fourth embodiment of a drive assembly in accordance with our invention.

FIG. 11 is a section taken substantially along the line 11—11 of FIG. 10 looking in the direction of the arrows.

FIG. 12 is a top view of a fifth embodiment of a drive assembly in accordance with our invention.

FIG. 13 is a section taken substantially along the line 13—13 of FIG. 12 looking in the direction of the arrows.

DETAILED DESCRIPTION OF THE PREFERRED EMBODIMENT

Referring now to the drawing and more particularly to FIGS. 1-5, the first embodiment of our invention is illustrated in conjunction with a telescopic tripot universal joint 10 which comprises an inner drive member 12, an outer drive member 14 and three drive assemblies 16.

The inner drive member 12 has three radial trunnions 18 which are spherically shaped and which are equally spaced in the circumferential direction. The outer drive member 14 has three longitudinal drive channels 20 which are also equally spaced in the circumferential direction. Each drive channel 20 has two flat longitudinal sides 21 on opposite side of the drive channel.

The three drive assemblies 16 are pivotally mounted on the respective spherically shaped trunnions 18 of the inner drive member 12 and disposed in the respective drive channels 20 of the outer drive member 14 so that the inner drive member 12 angulates and translates with respect to the outer drive member 14 in a well known manner which is described in greater detail in U.S. Pat. No. 4,768,990 issued to Robert C. Farrell and Raymond J. Schultz Sept. 6, 1988.

The typical drive assembly 16 comprises a rectangularly shaped bearing block 22 which has a spherical socket 24 which fits onto an associated radial trunnion 18 which is spherically shaped to pivotally mount the drive assembly 16 o the radial trunnion 18. The bearing block 22 has a continuous, rectangularly shaped, roller track 26 which is between upper and lower ledges 28 of the bearing block 22. The continuous roller track 26 includes two straight raceways 30 which are on opposite driving sides of the bearing block 22 which means that the two straight raceways 30 face respective opposite longitudinal sides 21 of an associated longitudinal channel 20 when the drive assembly 16 is mounted on the radial trunnion 18 and disposed in the drive channel 20.

The continuous roller track 26 further includes returns extending between the ends of the two straight raceways 30. These returns include two straight raceways 32 which are on opposite ends of the bearing block 22 and a curved raceway 34 at each end of the straight raceways 30. The length of the bearing block 22, that is, the length L in the direction of the driving sides which include two straight raceways 30, is preferably greater than its width W in the direction perpendicular to the straight raceways 30 so that the drive assemblies 16 cannot fit in the drive channels 20 unless the drive assemblies 16 are correctly oriented with the straight raceways 30 confronting the longitudinal sides 21 of the drive channels 20. The bearing blocks 22 need not be rectangularly shaped as other shapes for the returns are also possible. However, it is still preferable to elongate the bearing blocks in the direction of the driving sides or straight raceways 30.

The drive assembly 16 further comprises a full complement of bearing rollers 36 which are disposed on the continuous roller track 26 and a two-piece cage 38 which is fixedly mounted on the bearing block 24 so that the bearing rollers 36 roll on the continuous roller track 26 in the manner of a recirculating roller bearing.

The bearing rollers 36 are needle shaped and have trunnions 40 at each end which engage the ledges 28 of the bearing block 22 to locate the bearing rollers 36 in the axial direction of the bearing rollers.

The two-piece cage 38 consists of cage pieces 42 and 44 which are mounted on the respective driving sides of the rectangular bearing block 22 so that each cage piece retains bearing rollers 36 on one of the two straight raceways 30 and at least part of the returns at each of its ends. The cage pieces 42 and 44 of the first embodiment are identical for a manufacturing advantage. The typical cage piece 42 comprises upper and lower plates 46, 48 which have peripheral rims 50, 52 which extend from end to end, and roller enclosing portions 54, 56 at each end.

The upper and lower plates 46, 48 fit over the upper and lower ledges 28 of the bearing block 22 with the rims 50, 52 projecting inwardly of the upper and lower ledges 28 to retain the bearing rollers 36 by trapping the bearing roller trunnions 40 between the roller track 26 and the rims 50, 52 of the cage piece 42.

The roller enclosing portions 54, 56 are disposed opposite the respective returns at each end of the straight raceway 30 which the cage piece 42 or 44 is associated with. The roller enclosing portions 54, 56 have curved ends which insure that the bearing rollers follow the curved raceways 34 at each end of the straight raceways 30 and straight portions which cover the rest of the return.

The rims 50, 52 and the roller enclosing portions 54, 56 of the cage piece 42 define a window 58. The bearing rollers 36 which are on the straight raceway 30 protrude through the window 58 for engagement with one of the opposite longitudinal sides 21 of the drive channel 20 as shown in FIGS. 1 and 4.

The cage piece 44 is identical to the cage piece 42 and corresponding parts have been identified with the same numerals. However, the cage piece 44 is upside down with respect to the cage piece 42 when it is assembled to the bearing block 22 as best shown in FIG. 3.

The cage pieces 42 and 44 are retained in assembly with the bearing block 22 by integral, snap together, lock arm arrangements comprising an extension 60 at the end of the roller engaging portion 54 of one cage piece which has a lanced lock nib 62 which engages in a slot 64 of an embossment 66 at the end of the roller engaging portion 56 of the other identical cage piece.

A second embodiment of our invention is illustrated in conjunction with FIGS. 6 and 7 which shows a typical drive assembly 116. The drive assembly 116 is basically the same as the drive assembly 16 except for the retention of the identical cage pieces 142 and 144. In this embodiment, lock arm arrangements comprise a lanced nib 160 of an end portion of the roller engaging portion 154 of one cage piece which engages in a slot 164 of an offset extension arm 166 at the end of the roller engaging portion 156 of the other identical cage piece.

A third embodiment of our invention is illustrated in conjunction with FIGS. 8 and 9 which shows a typical drive assembly 216. This drive assembly 216 is likewise basically the same as the drive assembly 16 except for the retention of the identical cage pieces 242 and 244. In this third embodiment, the lock arm arrangements are on the top and bottom of the identical cage pieces 242 and 244. In this instance the lower plate 248 of cage piece 244 (which is upside down in FIGS. 8 and 9) has end tabs 260 which fit through slots 264 of offset arms 266 at the end of the the upper plate 246 of cage piece 242. The tabs 260 which extend through the slots 264 are bent over the offset arms 266 as shown in FIG. 9. The lock arm arrangements on the bottom are opposite, that is the lower plate 248 of cage piece 242 has the tabs 260 while the upper plate 246 of cage piece 244 has the slotted offset arms 266.

A fourth embodiment of our invention is illustrated in conjunction with FIGS. 10 and 11 which shows a typical drive assembly 316. The drive assembly 316 is also basically the same as the drive assembly 16 except for the retention of the identical cage pieces 342 and 344. In this embodiment, the identical cage pieces 342 and 344 which are also symmetrical, are individually retained by the bearing block 322 which has two grooves 324 in its upper surface and two identical grooves 326 in its lower surface. The upper plates 346 of cage pieces 342 and 344 each have two end tabs 360 which are bent down into the grooves 324. Similarly, the lower plates 348 of the cage pieces 342, 344 each have two end tabs 362 which are bent down into the grooves 326.

A fifth embodiment of our invention is illustrated in conjunction with FIGS. 12 and 13 which shows a typical drive assembly 416 which is still basically the same as the drive assembly 16 except for the retention of the identical cage pieces 442 and 444. In this embodiment, the upper and lower plates 446, 448 of the cage pieces 442 and 444 are spot welded together after the cage pieces 442 and 444 are assembled to the drive block upside down with respect to each other. To this end, the upper plates 446 of cage pieces 442 and 444 each have two offset weld tabs 460 which overlie the end of the lower plates 448 of the opposite cage piece.

We wish it to be understood that we do not desire to be limited to the exact details of constructions shown and described, for obvious modifications will occur to a person skilled in the art.

The embodiments of the invention in which an exclusive property or privilege is claimed are defined as follows:

1. A drive assembly for a universal joint having an inner drive member which has a plurality of radial trunnions and an outer drive member which has a plurality of longitudinal channels, the drive assembly comprising:

a bearing block which is adapted to be mounted on a radial trunnion on the universal joint and which has a continuous roller track which includes two straight raceways which are on opposite driving sides of the bearing block which face respective opposite longitudinal sides of a longitudinal channel when the bearing block is mounted on the radial trunnion and the drive assembly is disposed in one of the longitudinal channels, a full complement of bearing rollers disposed on the continuous roller track of the bearing block, and a cage fixedly mounted on the bearing block so that the rollers roll on the continuous roller track in the manner of a recirculating roller bearing, the cage comprising first and second cage pieces which are mounted on the respective opposite driving sides of the bearing block so that a single one of the first and second cage pieces retains all of bearing rollers on the respective straight raceways for each driving side.

2. The drive assembly as defined in claim 1 wherein each cage piece has roller enclosing portions at each end which define d window which the bearing rollers which are on the associated straight raceway protrude through for engagement with one of the opposite longitudinal sides of the longitudinal channel.

3. The drive assembly as defined in claim 1 wherein the first and second cage pieces are retained on the drive block by fastening the cage pieces to each other.

4. The drive assembly as defined in claim 3 wherein the first and second cage pieces are identical.

5. The drive assembly as defined in claim 1 wherein the first and second cage pieces are individually retained by fastening each to the drive block.

6. The drive assembly as defined in claim 5 wherein the first and second cage pieces are identical and symmetrical.

7. A drive assembly for a universal joint having an inner drive member which has a plurality of radial trunnions and an outer drive member which has a plurality of longitudinal channels, the drive assembly comprising:

a bearing block which is adapted to be mounted on a radial trunnion of the universal joint and which has a continuous roller track which includes two straight raceways which are on opposite driving sides of the bearing block which face respective opposite longitudinal sides of a longitudinal channel when the bearing block is mounted on the radial trunnion and the drive assembly is disposed in one of the longitudinal channels, a full complement of bearing rollers disposed on the continuous roller track of the bearing block, and a cage fixedly mounted on the bearing so that the rollers roll on the continuous roller track in the manner of a recirculating roller bearing, the cage comprising first and second cage pieces which are mounted on the respective opposite driving sides of the bearing block so that one cage piece retains all of the bearing rollers on one of the two straight raceways and the other cage piece retains all of the bearing rollers on the other of the two straight raceways, each cage piece having a window which the bearing rollers which are on the associated straight raceway protrude through for engagement with one of the opposite longitudinal sides of the longitudinal channel.

8. The drive assembly as defined in claim 7 wherein the first and second cage pieces are retained on the drive block by fastening the cage pieces to each other.

9. The drive assembly as defined in claim 8 wherein the first and second cage pieces are identical.

10. The drive assembly as defined in claim 7 wherein the first and second cage pieces are individually retained by fastening each to the drive block.

11. The drive assembly as defined in claim 10 wherein the first and second cage pieces are identical and symmetrical.

12. A drive assembly for a universal joint having an inner drive member which has a plurality of radial trunnions and an outer drive member which has a plurality of longitudinal channels, the drive assembly comprising:

a bearing block which is adapted to be mounted on a radial trunnion of the universal joint and which has a continuous roller track which includes two straight raceways which are on opposite driving sides of the bearing block so that the two straight raceways which face respective opposite longitudinal sides of a longitudinal channel when the bearing block is mounted on the radial trunnion and the drive assembly is disposed in one of the longitudinal channels, the continuous roller track being configured so that each of the two straight raceways has a curved raceway at each end, a full complement of bearing roller disposed on the continuous roller track of the bearing block, and a cage fixedly mounted on the bearing block so that the rollers roll on the continuous roller track in the manner of a recirculating roller bearing, the cage comprising first and second cage pieces which are mounted on the respective opposite driving sides of the bearing block so that all the bearing rollers on each respective straight raceway are retained solely by the first and second cage pieces respectively, and each cage piece having peripheral rims and roller enclosing portions at each end which define a window which the bearing rollers which are on the associated straight raceway protrude through for engagement with one of the opposite longitudinal sides of the longitudinal channel.

13. The drive assembly as defined in claim 12 wherein the first and second cage pieces are retained on the drive block by fastening the cage pieces to each other.

14. The drive assembly as defined in claim 13 wherein the first and second cage pieces are identical.

15. The drive assembly as defined in claim 12 wherein the first and second cage pieces are individually retained by fastening each to the drive block.

16. The drive assembly as defined in claim 15 wherein the first and second cage pieces are identical and symmetrical.

* * * * *